US008284448B2

(12) United States Patent
Fujiwara et al.

(10) Patent No.: US 8,284,448 B2
(45) Date of Patent: Oct. 9, 2012

(54) IMAGE PROCESSING APPARATUS PERFORMING COLOR CONVERSION

(75) Inventors: Michiko Fujiwara, Yamatokoriyama (JP); Kyosuke Taka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 883 days.

(21) Appl. No.: 12/313,232

(22) Filed: Nov. 18, 2008

(65) Prior Publication Data

US 2009/0147325 A1 Jun. 11, 2009

(30) Foreign Application Priority Data

Nov. 20, 2007 (JP) ................................. 2007-300762

(51) Int. Cl.
*H04N 1/46* (2006.01)
*G03F 3/08* (2006.01)
*G09G 5/02* (2006.01)

(52) U.S. Cl. .......... 358/1.9; 358/2.1; 358/518; 358/523; 358/524; 382/164

(58) Field of Classification Search .................... 358/1.9, 358/2.1, 448, 462, 518, 523, 524, 505; 345/589, 345/590, 597, 613; 382/164, 100; 715/274, 715/202, 241
See application file for complete search history.

(56) References Cited

U.S. PATENT DOCUMENTS

| | | | |
|---|---|---|---|
| 5,835,098 A * | 11/1998 | Lipton | 345/589 |
| 6,351,320 B1 * | 2/2002 | Shin | 358/1.9 |
| 6,681,041 B1 * | 1/2004 | Stokes et al. | 382/164 |
| 6,885,408 B2 | 4/2005 | Hirano et al. | |
| 6,906,827 B1 * | 6/2005 | Katayama | 358/1.9 |
| 6,972,804 B2 | 12/2005 | Hirano et al. | |
| 6,975,365 B2 | 12/2005 | Hirano et al. | |
| 7,042,517 B2 | 5/2006 | Hirano et al. | |
| 7,292,253 B2 * | 11/2007 | Asai et al. | 345/613 |
| 7,554,694 B2 * | 6/2009 | Itagaki | 358/1.9 |
| 2001/0048530 A1 * | 12/2001 | Hayashi et al. | 358/1.13 |
| 2004/0001229 A1 * | 1/2004 | Hanyu | 358/2.1 |
| 2005/0036173 A1 * | 2/2005 | Hayashi et al. | 358/2.1 |
| 2005/0088698 A1 | 4/2005 | Matama | |
| 2005/0219261 A1 * | 10/2005 | Asai et al. | 345/613 |
| 2006/0007455 A1 * | 1/2006 | Bailey | 358/1.9 |
| 2006/0055657 A1 * | 3/2006 | Koyama et al. | 345/102 |
| 2007/0070469 A1 * | 3/2007 | Oh et al. | 358/527 |
| 2008/0235564 A1 * | 9/2008 | Erol et al. | 715/202 |
| 2009/0087017 A1 * | 4/2009 | Onishi et al. | 382/100 |
| 2011/0055695 A1 * | 3/2011 | Oh et al. | 715/274 |
| 2011/0296297 A1 * | 12/2011 | Shudo | 715/241 |

FOREIGN PATENT DOCUMENTS

| | | |
|---|---|---|
| JP | 6-008524 A | 1/1994 |
| JP | 2001-358954 | 12/2001 |

(Continued)

*Primary Examiner* — Kimberly A Williams
(74) *Attorney, Agent, or Firm* — Edwards Wildman Palmer LLP; David G. Conlin; David A. Tucker

(57) ABSTRACT

An image processing apparatus handling combined data including read data from a scanner and written data written by a touch pen, capable of performing appropriate color conversion both on the read data and written data is provided. When a display image obtained by combining the read data and the written data is to be printed, the image processing apparatus executes first image processing on the read data, and second image processing on the written data, respectively. By an image forming apparatus, the combined data including the read data and the written data, which have been appropriately color-converted by respective image processing, is printed.

20 Claims, 13 Drawing Sheets

FOREIGN PATENT DOCUMENTS

| JP | 2005-094306 | 4/2005 |
| JP | 2005-117407 | 4/2005 |
| JP | 2006-197549 A | 7/2006 |
| JP | 2006-287693 | 10/2006 |

* cited by examiner

| COLOR | DISPLAY DEVICE | | | OUTPUT DEVICE | | | |
|---|---|---|---|---|---|---|---|
| No. | R | G | B | C | M | Y | K |
| 1 | 0 | 255 | 0 | 255 | 0 | 255 | 0 |
| 2 | 0 | 250 | 0 | 250 | 0 | 250 | 0 |
| 3 | 5 | 245 | 5 | 250 | 5 | 250 | 0 |
| . | . | . | . | . | . | . | . |
| . | . | . | . | . | . | . | . |
| . | . | . | . | . | . | . | . |
| 255 | 0 | 0 | 0 | 0 | 0 | 0 | 100 |
| . | . | . | . | . | . | . | . |
| . | . | . | . | . | . | . | . |
| . | . | . | . | . | . | . | . |
| 510 | 255 | 255 | 255 | 0 | 0 | 0 | 0 |
| . | . | . | . | . | . | . | . |
| . | . | . | . | . | . | . | . |
| . | . | . | . | . | . | . | . |

| INPUT DEVICE | OUTPUT DEVICE |
|---|---|
| PEN THICKNESS | PRINTER DOT NUMBER |
| 0 | 21 |
| 1 | 28 |
| 2 | 35 |
| . | . |
| . | . |
| . | . |

IMAGE PROCESSING APPARATUS PERFORMING COLOR CONVERSION

CROSS-REFERENCE TO RELATED APPLICATION

This nonprovisional application claims priority under 35 U.S.C. §119(a) on Patent Application No. 2007-300762 filed in Japan on Nov. 20, 2007, the entire contents of which are hereby incorporated by reference.

BACKGROUND OF THE INVENTION

1. Field of the Invention

The present invention relates to an image processing apparatus processing color image data including two or more types of image data and, more specifically, to a technique of outputting color image data including two or more types of image data in good color tone.

2. Description of the Background Art

Recently, a display apparatus including a large display and a PC (Personal Computer) connected thereto comes to be widely used as a presentation tool for a meeting, conference and the like. PC displays data and the like input from an external device such as a scanner on the large display. The large display gives highly effective visual impression to the attendants of a conference and improves information transmitting effect of the presentation.

As a method of more effectively using a display apparatus as such, the display apparatus may be connected to an image forming apparatus to form a system. If it becomes possible to print the data displayed on the display apparatus, the printout may be used as materials or proceedings of the conference. The systemization attains the effects of better understanding of conference contents by the attendants and better knowledge of conference contents by parties involved but not attending the conference.

In a meeting, a user of the display apparatus may display data read from a scanner (hereinafter referred to as "read data") on the large display and he/she may write electronic figure, character data and the like using a drawing application, for example, to indicate a part of the displayed image or to write notes. Data written in this manner will be hereinafter referred to as "written data." When combined data including the read data and written data is displayed on a screen, the written data tends to appear brighter and sharper than the read data. The reason may be that the user often selects a brilliant color different from the read data on the background, when he/she forms the written data. Thus, on the displayed image, the written data and read data are displayed distinguished from each other and, therefore, the written data can serve as a pointer.

When image data provided by combining different types of data is to be output to a certain device, sometimes there arises a problem in the image to be output.

By way of example, broadcast image handling image signals of a plurality of different formats (hereinafter referred to as "multi-format data image") sometimes encounters the following problem. The multi-format data image refers to an image on which image signals of different formats such as moving image, still image and teletext broadcasting are displayed on one image plane. The moving image, still image and teletext broadcasting have mutually different image characteristics and, when an image of a certain type is to be displayed with high quality, image or images of other type or types come to be less visible.

A solution to such a problem is disclosed in Japanese Patent Laying-Open No. 2002-44559 (hereinafter referred to as "'559 application"). According to the technique disclosed in '559 application, in multi-format broadcast image, data of various formats are separated from each other to form layered image signals, different image processing is executed on each layered image signal in accordance with parameters set in advance in accordance with characteristics of each data, and thereafter, the results are combined and displayed. Therefore, it is possible to improve image quality in displaying data of each format.

In the image processing apparatus displaying combined data in which read data and written data are superposed, when the combined data is printed, particularly the written data tends to be less sharp or darker and duller than when it is displayed. This is because RGB value ranges that the read data can assume on the display differ from those of the written data.

Graph 1 shown in FIG. 1A represents the ranges of RGB values for the read data. Graph 2 shown in FIG. 1B represents the ranges of RGB values for the written data. In FIGS. 1A and 1B, the abscissa represents the value of R, the depth represents the value of G and the ordinate represents the value of B, respectively. Numerical ranges of R, G and B values are each 0.0 to 255.0.

Referring to FIGS. 1A and 1B, when we compare Graph 1 (read data) with Graph 2 (written data), it can be seen that read data has narrower numerical ranges of R, G and B values than the written data. This comes from characteristics of an image reading device such as a scanner. When images having RGB value ranges different from each other are simply superposed and processed for printing, it is impossible to print images all in a preferred manner.

The apparatus disclosed in '559 application is directed to improving display image quality when image signals of mutually different formats are displayed superposed one after another. Therefore, this technique cannot directly be applied when image data having different RGB value ranges are to be combined and printed. Accordingly, the technique disclosed in '559 application cannot solve the problem that combined data including read data and written data cannot appropriately be printed by the image processing apparatus.

There is also a problem peculiar to the written data that the data is visibly well recognized when displayed in brilliant color on the screen while the written data is printed not in such a brilliant color but dull tone and hence, it becomes difficult to distinguish the written data from the read data. The technique disclosed in '559 application cannot solve such a problem, either.

Specifically, the conventional technique has a problem that appropriate image processing cannot be done on image data including color image data of a first type and color image data of a second type.

SUMMARY OF THE INVENTION

An object of the present invention is to provide an image processing apparatus, handling combined data including the color image data of the first type and the color image data of the second type, capable of performing appropriate color conversion both on the color image data of the first type and the color image data of the second type.

Another object of the present invention is to provide an image processing apparatus, handling combined data including the color image data of the first type and the color image data of the second type, capable of performing appropriate color conversion both on the color image data of the first type and the color image data of the second type, and capable of outputting the data superposed on each other.

According to an aspect, the present invention provides an image processing apparatus, including: a storage unit storing color image data including color image data of a first type and color image data of a second type; a first image processing circuit executing a first color conversion process on the color image data of the first type, in response to a predetermined instruction of image processing; and a second image processing circuit executing, in response to the instruction, a second color conversion process different from the first color conversion process, on the color image data of the second type.

It is often the case that the color image data of the first type and the color image data of the second type have different color characteristics. Therefore, when the same color conversion process is executed on these data, image quality of an image coming from at least either one of the color image data degrades unavoidably. On the contrary, when the first color conversion process is performed on the color image data of the first type by the first image processing circuit and the second color conversion process different from the first color conversion process is performed on the color image data of the second type by the second image processing circuit, both color conversions can be performed appropriately. As a result, an image processing apparatus handling combined data including color image data of the first type and the color image data of the second type, capable of performing appropriate color conversion both of the color image data of the first type and the color image data of the second type can be provided.

Preferably, the image processing apparatus further includes an output device superposing, on the color image data of the first type color-converted by the first image processing circuit, the color image data of the second type color-converted by the second image processing circuit, and outputting the superposed data.

As the output device is provided, it is possible to superpose, on the color image data of the first type that has been color-converted by the first image processing circuit, the color image data of the second type that has been color-converted by the second image processing circuit. As a result, an image processing apparatus handling combined data including color image data of the first type and the color image data of the second type, capable of performing appropriate color conversion on the color image data of both the first and second types, and superposing and outputting the results can be provided.

More preferably, the first image processing circuit includes a first profile designating unit designating, in response to the instruction, a first color conversion profile prepared in advance for the color image data of the first type, and a first color-conversion circuit executing, in response to the instruction, the first color conversion process on the color image data of the first type based on the first color conversion profile designated by the first profile designating unit.

More preferably, the second image processing circuit includes a second profile designating unit designating, in response to the instruction, a second color conversion profile, different from the first color conversion profile, prepared in advance for the color image data of the second type, and a second color conversion circuit executing, in response to the instruction, the second color conversion process on the color image data of the second type based on the second color conversion profile designated by the second profile designating unit.

As described above, the first image processing circuit designates the first color conversion profile among profiles prepared in advance, for the color image data of the first type, and executes the first color conversion process based on the designated color conversion profile. Further, the second image processing circuit designates the second color conversion profile among the profiles prepared in advance, and executes the second color conversion process based on the designated color conversion profile on the color image data of the second type. As a result, an image processing apparatus handling combined data including color image data of the first type and the color image data of the second type, capable of performing more appropriate color conversion on each of the color image data of the first type and the color image data of the second type can be provided.

More preferably, the image processing apparatus further includes a controller enabling or disabling the second image processing circuit. The first image processing circuit includes an image processing executing unit executing, when the second image processing circuit is disabled by the controller, the first color conversion process both on the color image data of the first type and the second type, and executing, when the second image processing circuit is enabled, the first color conversion process on the color image data of the first type.

Accordingly, if the second image processing circuit is enabled, it is possible to execute appropriate image processing both on the color image data of the first type and the second type, as described above. If there is not much color distribution difference between the color image data of the first type and the color image data of the second type, or if the user does not wish to have separate image processing, the second image processing circuit is disabled, and the first color conversion process is executed on the color image data of the first type and the color image data of the second type.

More preferably, the first and second color conversion profiles include first and second color conversion tables for converting values of RGB color system of the color image data of the first and second types to values of CMYK color system, respectively.

As a result, in connection with combined data including the color image data of the first type and the color image data of the second type, more appropriate color conversion becomes possible for outputting image data of both the color image data of the first type and the color image data of the second type.

More preferably, in the first color conversion table, a range of RGB values that can be converted to the CMYK values is selected to be narrower than a range of RGB values that can be converted to the CMYK values in the second color conversion table.

Consequently, more appropriate color conversion becomes possible for outputting image data of both the color image data of the first type and the color image data of the second type having different ranges of RGB color system values.

More preferably, the image processing apparatus further includes a reading device reading image information of a document and outputting the read image information as the color image data of the first type; a display device displaying an image based on the read data; and a receiving unit receiving image information written to the image displayed on the display device, and outputting the image information as the color image data of the second type.

As described above, when the color image data of the first type is the image information output by the reading device and the color image data of the second type is the image information output by a receiving unit, it is often the case that the color image data of the first type and the color image data of the second type have distinctively different color characteristics. Therefore, by adapting the image processing apparatus to include the above-described components, an image processing apparatus handling combined data including the color image data of the first type and the color image data of the second type, capable of performing more appropriate color conversion both on the color image data of the first type and the color image data of the second type can be provided.

More preferably, the first image processing circuit includes a first profile designating unit designating, in response to the instruction, a first color conversion profile prepared in advance for the color image data of the first type; and the second image processing circuit includes a second profile designating unit designating, in response to the instruction, a second color conversion profile, different from the first color conversion profile, prepared in advance for the color image data of the second type. The image processing apparatus further includes a transmitting unit transmitting to the outside, a combination of the color image data of the first type and the first color conversion profile, and a combination of the color image data of the second type and the second color conversion profile.

As described above, the combination of the color image data of the first type and the first color conversion profile, and the combination of color image data of the second type and the second color conversion profile are transmitted and, therefore, the external device such as the printer receiving these combinations can perform color conversion processes using the first color conversion profile for the color image data of the first type and using the second color conversion profile for the color image data of the second type. As a result, an image processing apparatus handling combined data including the color image data of the first type and the color image data of the second type, enabling an external device such as a printer to perform appropriate color conversion both on the color image data of the first type and the color image data of the second type can be provided.

More preferably, the image processing apparatus further includes a determination circuit determining, in response to the instruction, whether or not color image data as an object of processing includes the color image data of the second type, and outputting a determination signal; and a suspending circuit suspending, when it is indicated by the determination signal that the color image data as the object of processing does not include the color image data of the second type, operation of the second image processing circuit.

As a result, meaningless execution of the second color conversion process on the color image data not including the color image data of the second type can be prevented, and hence, load on the image processing apparatus can be alleviated.

According to another aspect, the present invention provides an image processing method, including the steps of: storing color image data including color image data of a first type and color image data of a second type; executing, in response to a predetermined instruction of image processing, a first color conversion process on the color image data of the first type; and executing, in response to the instruction, a second color conversion process, different from the first color conversion process, on the color image data of the second type.

Preferably, the image processing method further includes the step of superposing, on the color image data of the first type color-converted at the step of executing the first color conversion process, the color image data of the second type color-converted at the step of executing the second color conversion process, and outputting the superposed data.

According to a further aspect, the present invention provides a computer program causing, when executed by a computer, the computer to operate as a storage unit storing color image data including color image data of a first type and color image data of a second type; a first image processing circuit executing a first color conversion process on the color image data of the first type, in response to a predetermined instruction of image processing; and a second image processing circuit executing, in response to the instruction, a second color conversion process different from the first color conversion process, on the color image data of the second type.

As described above, according to the present invention, the first color conversion process is executed on the color image data of the first type by the first image processing circuit, and the second color conversion process different from the first color conversion process is performed on the color image data of the second type by the second image processing circuit. This arrangement enables appropriate color conversions of both. Therefore, an image processing apparatus handling combined data including the color image data of the first type and the color image data of the second type, capable of performing appropriate color conversion both on the color image data of the first type and the color image data of the second type can be provided.

Further, by superposing, on the color image data of the first type color-converted by the first image processing circuit, the color image data of the second type color-converted by the second image processing circuit and by outputting the result, it becomes possible, in connection with the combined data including the color image data of the first type and the color image data of the second type, to perform appropriate color conversion both on the color image data of the first type and the color image data of the second type, and to superpose the data on each other and output the results.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
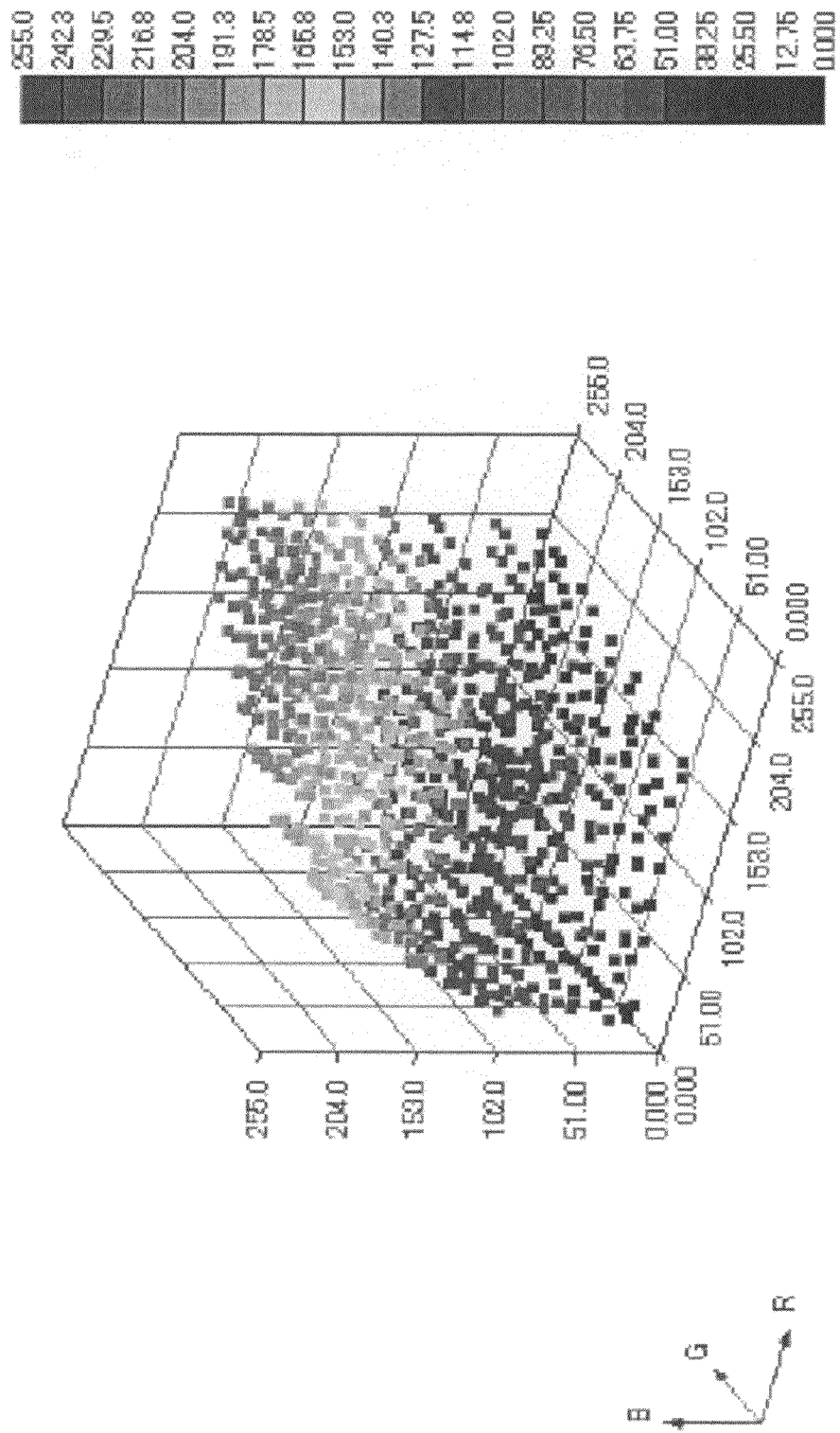
FIGS. 1A and 1B are three-dimensional graphs representing RGB values possibly assumed by the read data and written data when these are displayed on a large display.
Figure 1B:
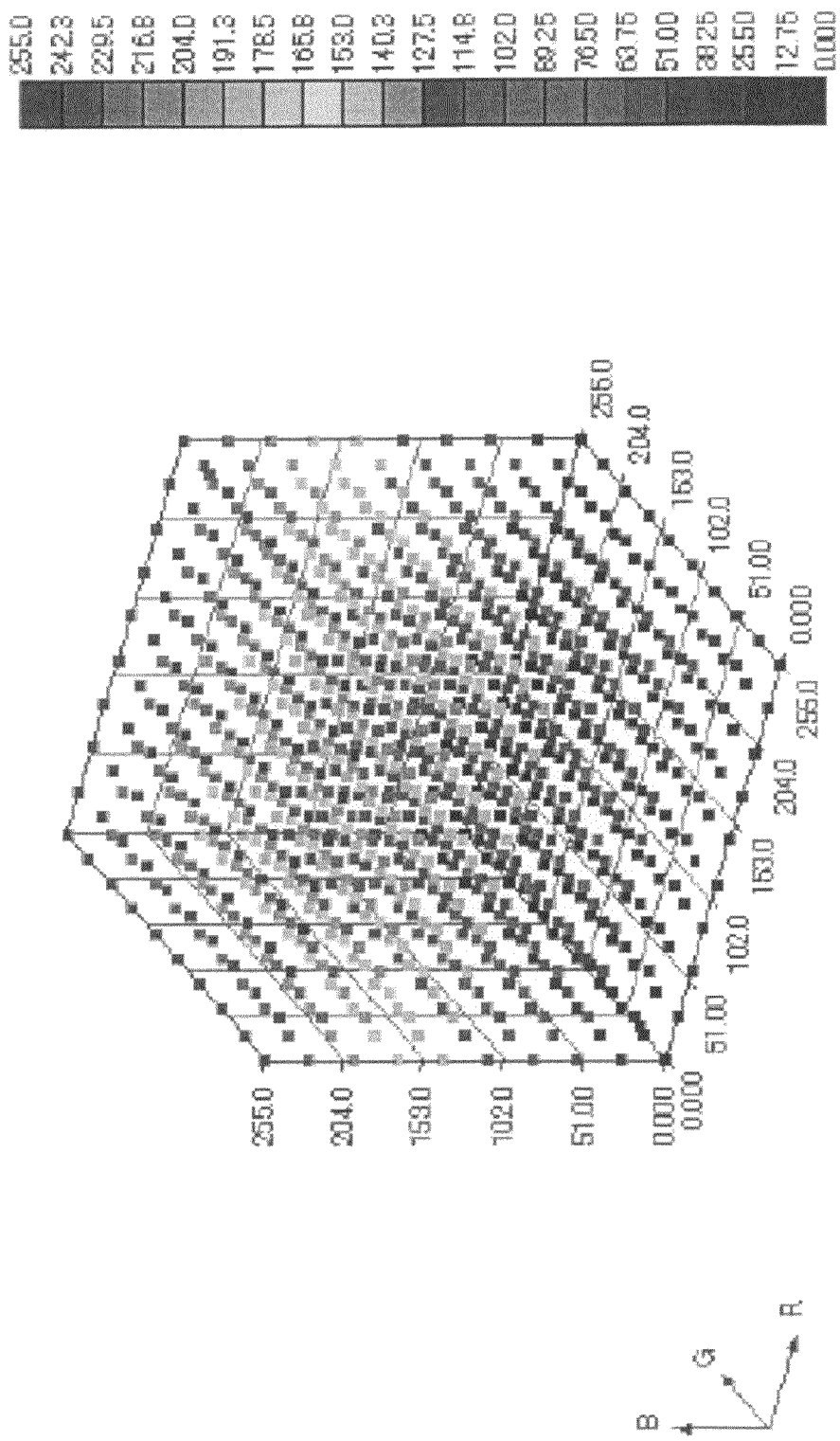

In the following description and in the drawings, the same components are denoted by the same reference characters and same names. Their functions are also the same. Therefore, detailed description thereof will not be repeated.

In the following, examples of display and printing of combined data including the read data and the written data, in accordance with the prior art will be described.

Figure 2:
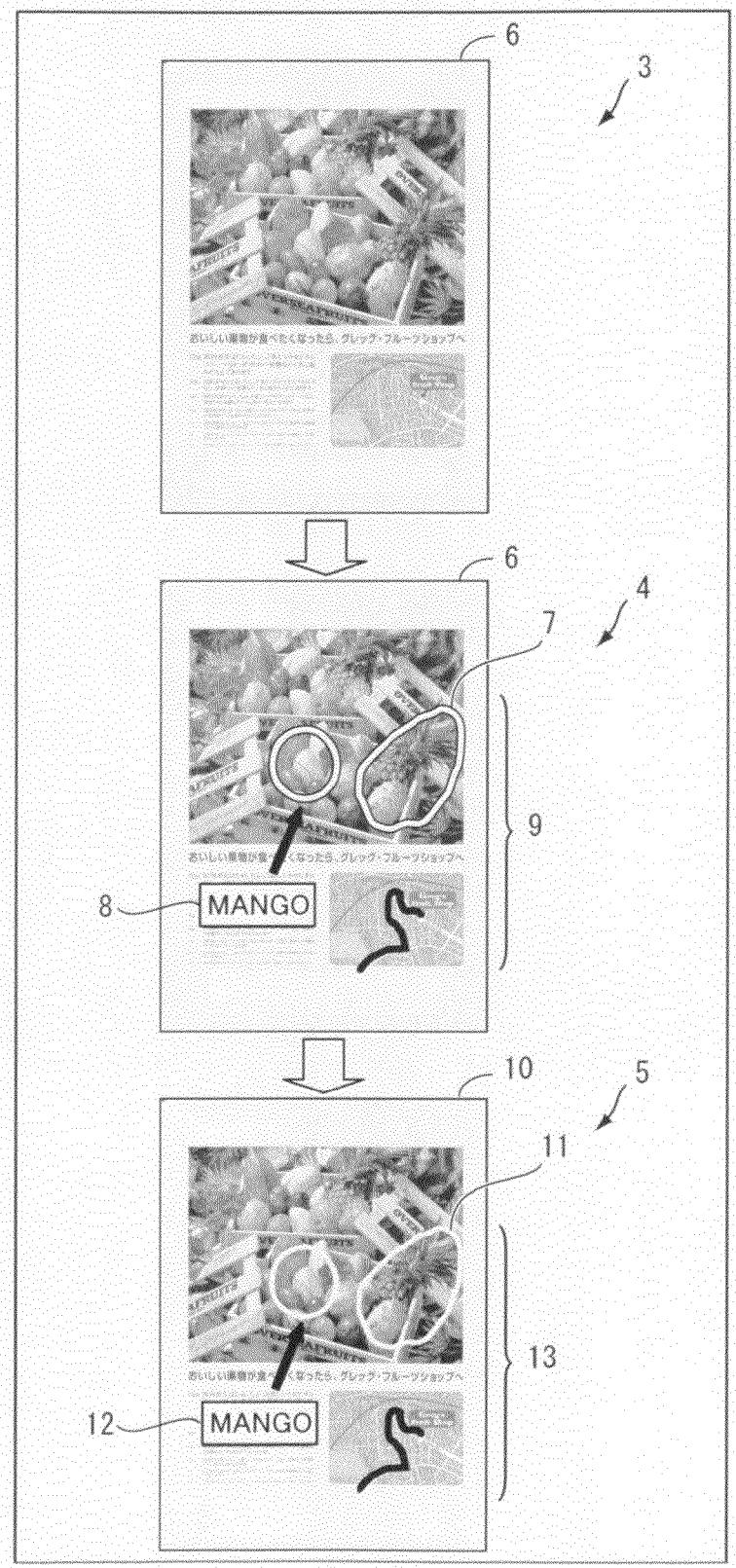
FIG. 2 shows examples of display and printing of combined data including the read data and written data, in accordance with the prior art.

Referring to FIG. 2, first, at the display unit of the image processing system, read data 6 only is displayed as a display image 3. Thereafter, when written data 9 including data 7 and data 8 are written, combined data including read data 6 and written data 9 is displayed as a display image 4.

When the combined data is to be printed, values of RGB color system used for display are converted to values of CMYK color system used for printing, by image processing. At the time of this conversion, it is necessary to convert each value of RGB color system to the value of CMYK color system, and data, referred to as a color conversion profile, determines the manner of conversion. The problem encountered when the combined data is printed described with reference to the prior art is considered to come from the fact that read data and written data exist mixed in the combined data and they have different ranges of possible RGB values, while image processing is executed using a single color conversion profile. The color conversion profile for printing is optimized such that the color tone displayed on the screen in RGB color system matches as well as possible with the color tone printed in CMYK color system.

Typically, when the combined data described above is printed, a color conversion profile optimized for the characteristics of read data is used. Therefore, when image processing is done using the same color conversion profile, the written data color becomes dull. Specifically, the written data is subjected to image processing using an inappropriate color conversion profile and, therefore, it comes to be printed in a color different from that when displayed.

Specifically, in a printed image 5 after printing shown in FIG. 2, an image 10 based on read data 6 can be printed in the same tone not different from that of read data 6 before printing, while image 13 (including an image 11 based on data 7 and an image 12 based on data 8) tends to be less sharp or to have duller color than before printing.

In order to solve this problem, in the embodiment described in the following, the read data and the written data are held in separate layers and stored distinguished from each other in a storage. At the time of printing, color conversion profiles optimized separately for the read data and the written data, respectively, are used to solve the problem.

First Embodiment

Figure 3:
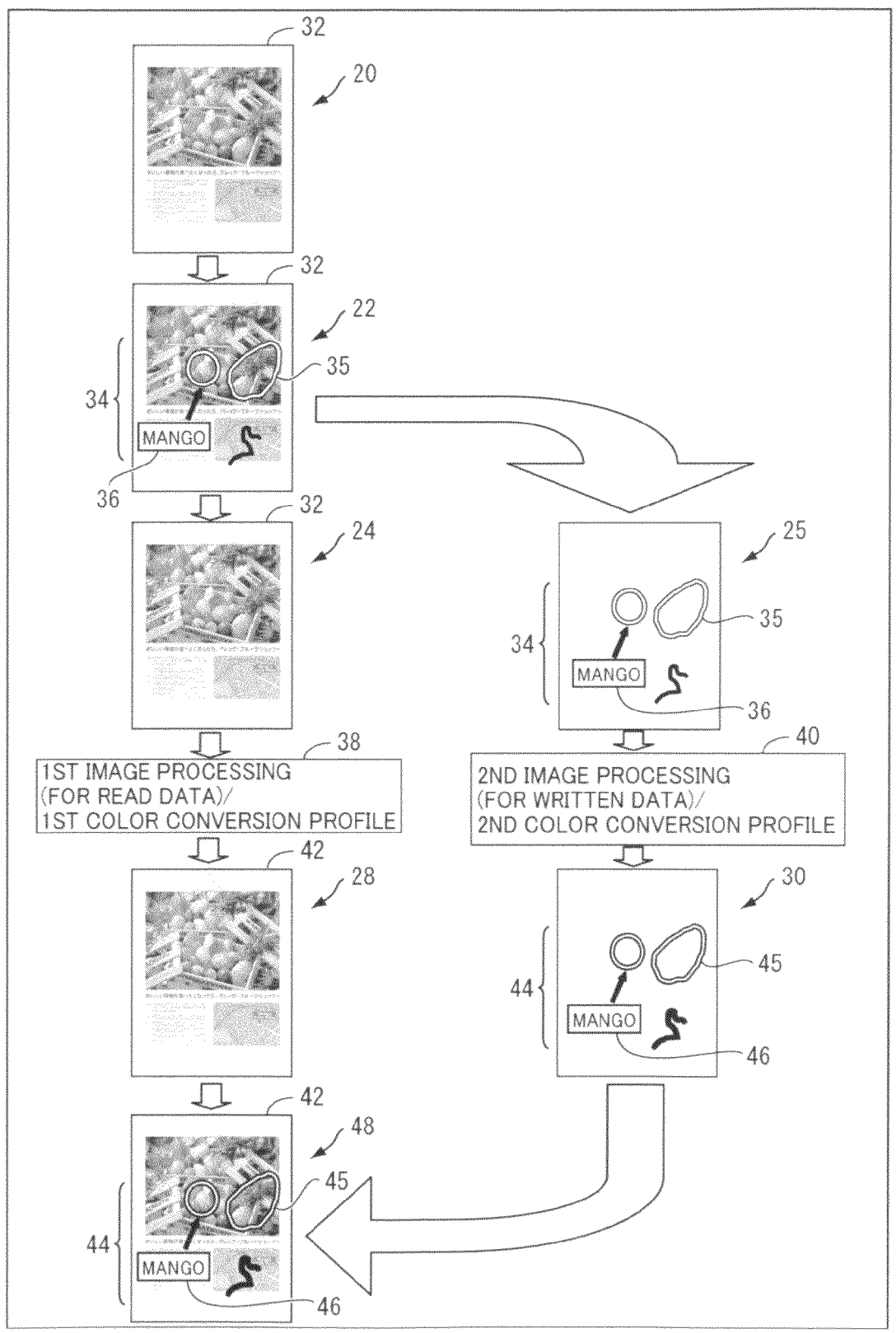
FIG. 3 shows examples of display and printing of combined data including the read data and written data, in accordance with an image processing system in accordance with the first embodiment.

Referring to FIG. 3, first, at the display unit of the image processing system, only read data 32 is displayed as displayed image 20. Thereafter, written data 34 including data 35 and data 36 are written, and combined data in which read data 32 and written data 34 are superposed, is displayed as displayed image 22. In the present embodiment, the combined data is stored with the read data and written data distinguished and separated from each other. Here, read data 32 is stored in a storage area 24 and written data 34 is stored in a storage area 25.

When there is an instruction to print the combined data, the image processing system in accordance with the first embodiment executes a first image processing 38 for the read data on the read data 32, and executes a second image processing 40 for the written data, different from the first image processing 38, on the written data 34. Specifically, in the first image processing 38, the read data is subjected to CMYK conversion using a first color conversion profile optimized for the read data. In the second image processing 40, the written data is subjected to CMYK conversion using a second color conversion profile optimized for the written data. The first color conversion profile is the same as that used in the prior art. The second color conversion profile is created such that each color of the written data to be printed can be visually recognized to be similar to the color of written data as displayed before image processing. These color conversion profiles are created in advance in accordance with combinations of characteristics of the display device and the printer.

The second image processing 40 further includes a process of converting thickness of written data, using a table related to thickness conversion, to meet user's demand to make the written data sharper and more emphasized, or make it less noticeable. The thickness conversion table used here is created in advance for the written data such that the thickness of a line forming the written data before image processing is converted at the time of printing. By way of example, using the thickness conversion table, a line in the written data is converted to a thicker line, so that a written image easier to view is formed in the printed image, as compared with the thickness as visually recognized in the displayed image.

In the present embodiment, as shown in FIG. 3, read data 32 is processed by the first image processing 38 using the first color conversion profile, and stored as read data 42 in a storage area 28. Written data 34 is processed by the second image processing 40 using the second color conversion profile, and stored as written data 44 in a storage area 30. These data are combined in a storage area 48. It is this combined data that is printed. In the combined data for printing, different from the prior art, written data 44 (including data 45 and data 46) is printed in the same or comparable color tone as the written data 34 as displayed, and hence, it can clearly be distinguished from the read data.

As described above, in the present embodiment, appropriate image processing can be done on each of the read data and written data. As a result, conventionally experienced problems that only the written data becomes less sharp or comes to have duller color at the time of printing, can be prevented.

—Structure—
<Appearance>

Figure 4:
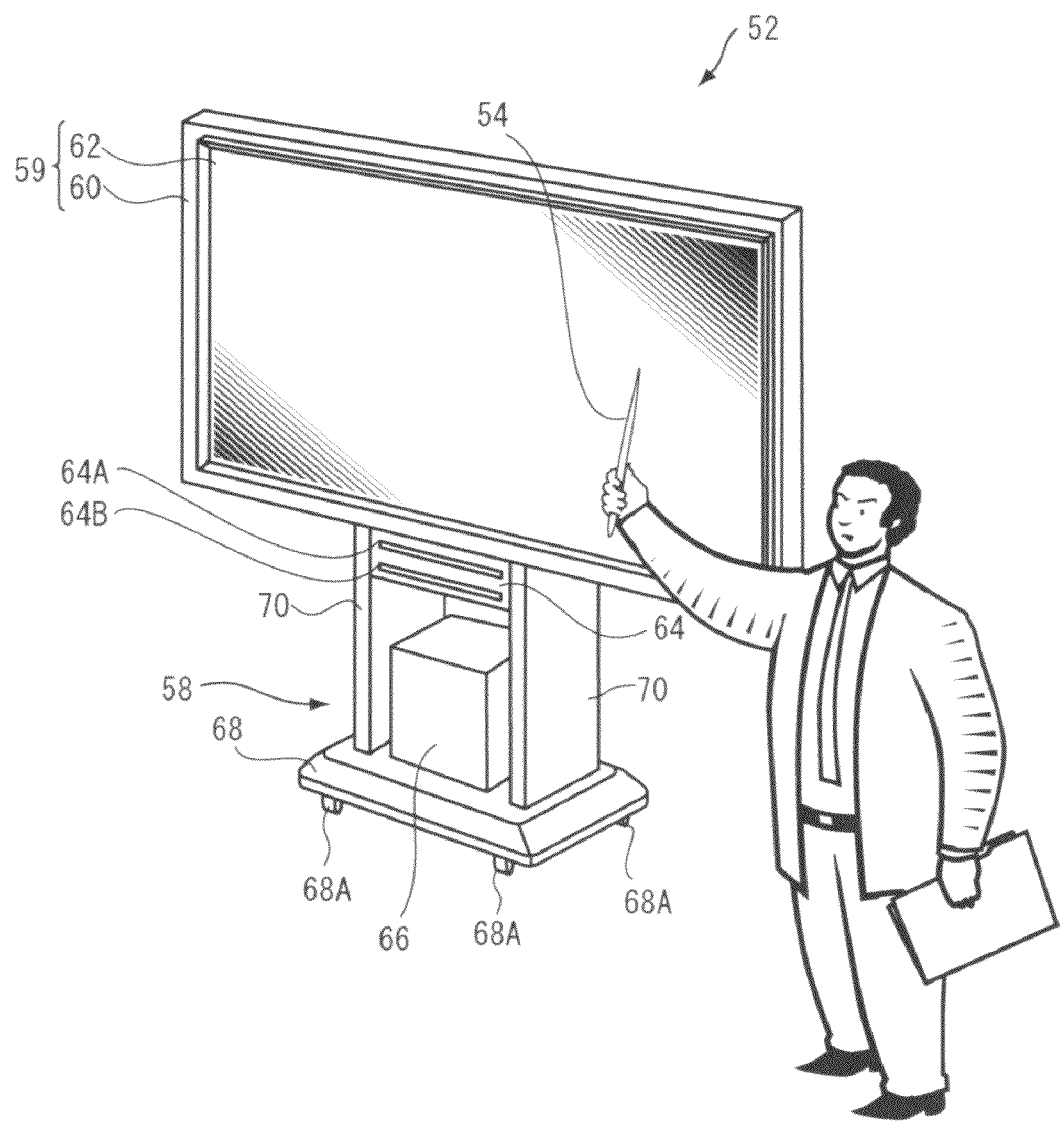
FIG. 4 is a perspective view showing an appearance of an information display apparatus 52 as a part of the image processing system in accordance with the first embodiment.

Referring to FIG. 4, information display apparatus 52 is a large information display apparatus used at a conference or the like. Information display apparatus 52 displays contents of proceedings of the conference on a display area described later in accordance with an instruction by the user input, for example, by a touch pen 54 designating a position on the display device, used, for example, by an organizer of the conference.

Information display apparatus 52 includes: a stand 58; a large LCD (Liquid Crystal Display) 60 having a rectangular shape long in the widthwise direction placed on an upper surface of stand 58; a transparent touch panel 62 having a shape similar to LCD 60 and provided integrally and overlapped on a front surface of LCD 60; a color scanner 64 arranged below LCD 60 and touch panel 62 and having a pair of openings 64A and 64B arranged one above the other on the front surface; and a PC 66 placed on stand 58.

Stand 58 includes a base 68 having a flat upper surface, and a pair of left and right legs 70 coupling base 68 to LCD 60. At the bottom of base 68, four casters 68A are rotatably attached for moving the information display apparatus 52. Each leg 70 is a wide, thin plate member, and the legs are erected spaced apart from each other by a prescribed distance on the upper surface of base 68. On the tip end surfaces of legs 70, LCD 60 is mounted. Between legs 70, PC 66 is placed.

LCD 60 has a display area for displaying image information, formed on the front surface. The display area of LCD 60 has a shape similar to the contour of LCD 60, and occupies most part of the front surface of LCD 60.

Scanner 64 is for reading a document for presentation and the like. The document is fed through upper opening 64A and discharged from lower opening 64B, of scanner 64. PC 66 is for controlling information display apparatus 52. This will be described later.

When a position on LCD 60 is designated by touch pen 54, touch panel 62 detects the position, and outputs it as coordinate information. Receiving the information, PC 66 can form written data input by the user, by an appropriate image processing program. Specifically, PC 66 forms the image input by the user.

<Hardware Configuration>

Figure 5:
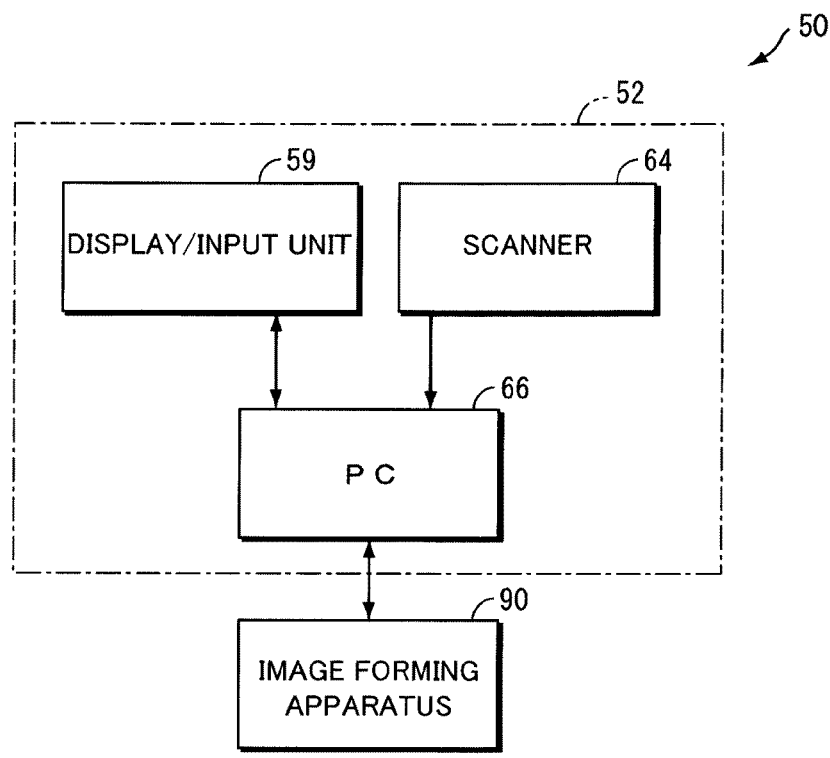
FIG. 5 shows, in a block diagram, hardware configuration of an image processing system 50 in accordance with the first embodiment.

Referring to FIG. 5, image processing system 50 includes information display apparatus 52 and an image forming apparatus 90 for printing print data output from information display apparatus 52.

Information display apparatus 52 includes a display/input unit 59 including LCD 60 and touch panel 62, scanner 64 and PC 66, as described above. Image forming apparatus 90 is connected to PC 66, and has a function of forming and printing an image in accordance with print data applied from PC 66. The print data output from PC 66 includes print object data represented in RGB color system and a color conversion table used for color conversion of the print object data, as will be described later. In the present embodiment, combinations of the print object data and color conversion table are created both for the read data and written data, and applied from PC 66 to image forming apparatus 90.

Figure 6:
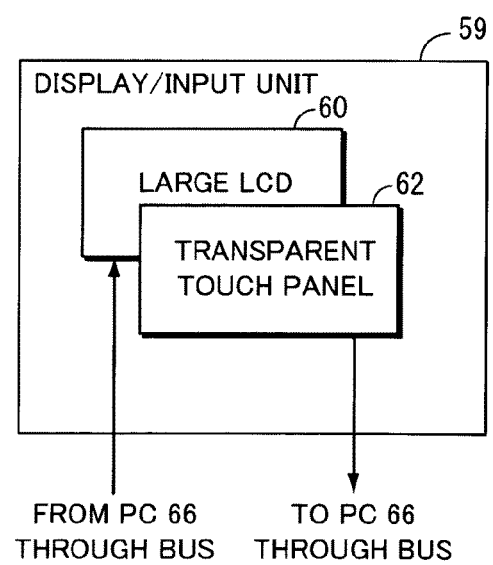
FIG. 6 shows, in a block diagram, hardware configuration of a display/input unit 59 shown in FIG. 5.

Referring to FIG. 6, display/input unit 59 includes: LCD 60 connected to PC 66 for displaying an image applied from PC 66 such as the read image read by scanner 64; and touch panel 62 connected to PC 66 and outputting to PC 66 the coordinate data representing the position on LCD 60 touched by the user using touch pen 54 shown in FIG. 4. Receiving the coordinate data, PC 66 determines an instruction from the user, or determines the shape of the data written by the user.

Figures 7, 8:
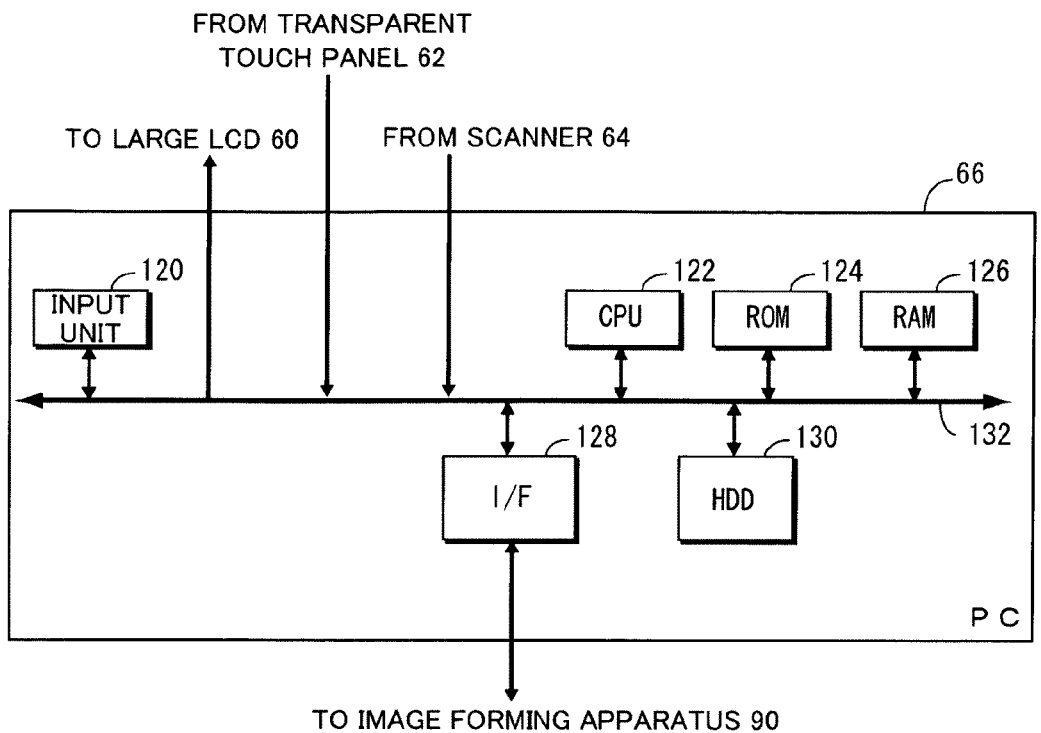
FIG. 7 shows, in a block diagram, hardware configuration of a PC 66 shown in FIG. 5.
FIG. 8 shows a color conversion table 180 for the written data.

Referring to FIG. 7, PC 66 includes a bi-directional bus 132, to which LCD 60, touch panel 62 and scanner 64 are connected. To the bus 132, connected are: an input unit 120 implemented by a keyboard, a mouse or the like, not shown, receiving a user input and converting the user instruction to a signal to be output to bus 132; an interface (hereinafter denoted by "I/F") 128 connected through bus 132 to image forming apparatus 90, for mediating data transmission to/reception from image forming apparatus 90 and various blocks on bus 132; a CPU (Central Processing Unit) 122 for executing a prescribed program to carry out separate image processing for printing on the read data and written data displayed on display/input unit 59 and executing a program to carry out general functions of the information display apparatus 52; an ROM (Read-Only Memory) 124 for storing a boot-up program of PC 66 and constants and the like used by CPU 122 when executing a program; an RAM (Random Access Memory) 126; and an HDD (Hard Disk Drive) 130 for storing programs to be executed by CPU 122 and storing data and the like to be displayed on LCD 60. PC 66 further includes a communication unit for communication with an external device, not shown.

The image processing program for printing, which will be described later, is transmitted from another device through the communication unit to PC 66, and stored in HDD 130. As will be readily understood by a person skilled in the art, a program stored in an external storage medium can be introduced to PC 66 by providing, in place of the communication unit, a device that is capable of reading tapes such as a magnetic tape and a cassette tape, disks such as a magnetic disk including flexible disk (FD) and hard disk, or optical disc including a CD-ROM (Compact Disc-Read Only Memory), MO (Magento-Optical Disk), MD (Mini Disk) and DVD (Digital Versatile Disk), or semiconductor memories such as a mask ROM, EPROM (Erasable Programmable Read Only Memory), EEPROM (Electrically Erasable Programmable Read Only Memory) and a flash memory.

In the following, the second color conversion profile used in the second image processing 40 shown in FIG. 3 will be described. Here, the profile is prepared in advance in the form of prescribed table information (color conversion table 180). The second color conversion profile is stored in HDD 130 shown in FIG. 7, a copy thereof is formed by CPU 122 upon receiving a print instruction, and the copy is stored in RAM 126. Referring to FIG. 8, color conversion table 180 includes a color No. column indicating color No. for identifying a color, a display device column indicating RGB values of each color displayed on LCD 60 shown in FIG. 6, and an output device column designating CMYK values of each color to be printed by image forming apparatus 90. By way of example, color No. 510 corresponds to white, and on the display device (LCD 60), it has the values of R=255, G=255 and B=255. At the time of printing, color No. 510 is converted by the output device (image forming apparatus 90) to the values of C=0, M=0, Y=0 and K=0.

Figures 9, 10:
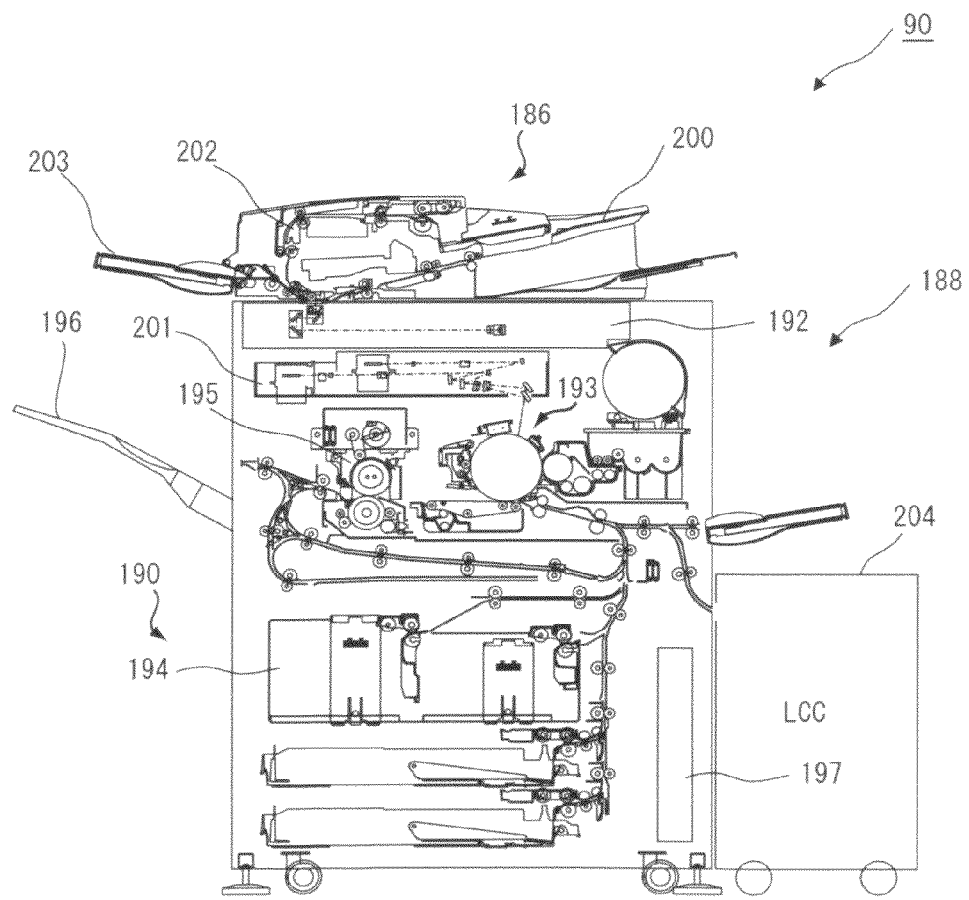
FIG. 9 shows a thickness conversion table 182 for the written data.
FIG. 10 shows an internal structure of an image forming apparatus 90 shown in FIG. 5.

In the following, the thickness conversion table used in the second image processing 40 shown in FIG. 3 will be described. The thickness conversion table is stored in HDD 130 shown in FIG. 7. Referring to FIG. 9, the thickness conversion table 182 includes an input device column indicating thickness of a pen input selected by the user when displayed on LCD 60, and an output device column indicating the number of printer dots corresponding to the thickness of each pen input when output from image forming apparatus 90. By way of example, written data input with pen thickness of 0 on the input device (LCD 60) is printed with the printer dot number of 21 by the output device (image forming apparatus 90), at the time of printing.

Referring to FIG. 10, image forming apparatus 90 is substantially a digital multifunctional printer. Image forming apparatus 90 includes an image forming unit 188, a document image reader 186 arranged above image forming unit 188, and a paper feed unit 190 arranged below image forming unit 188.

Document image reader 186 includes a document tray 200, an automatic document feeder 202 for feeding a document placed on document tray 200 to an image information reading unit 192, which will be described later, and a document discharge tray 203 for receiving the discharged document after completion of the image reading process.

Document image reader 186 includes an image information reading unit 192 for reading image information of a document fed to a document reading position by automatic document feeder 202 arranged on the upper surface. Image information reading unit 192 includes, though not shown, a document scanning unit, an optical lens and a CCD (Charge Coupled Device) line sensor as a photoelectric conversion element, which reciprocate parallel to the upper surface of image information reading unit 192. Image information reading unit 192 reads black-and-white image and color image of a document, and outputs image information of the image.

Image forming unit 188 includes: an image processing unit, which will be described later, connected to receive output signals from image information reading unit 192 and from an external device such as PC 66, not shown in FIG. 10, executing an image conversion process for printing on the output signals applied from image information reading unit 192 and from the external device, and outputting image information; and an image forming device 193 connected to receive an output signal from the image processing unit, and forming an image based on the output signal from the image processing unit. Image forming device 193 has the same structure as a common color printer, and includes a photoreceptor drum, a laser scanning unit (LSU) 201 irradiating the photoreceptor drum with laser beam based on an input signal and forming an electrostatic latent image on the drum, and a developer and a transfer unit, for forming a toner image on a sheet of recording paper based on the formed electrostatic latent image.

Image forming unit 188 further includes: a fixing unit 195 for fixing the image formed by image forming device 193 and transferred to the sheet of recording paper, on the sheet of recording paper; a paper discharge unit 196 for receiving discharged sheet of recording paper on which the image has been fixed; and a control unit 197 for controlling overall operations of image forming apparatus 90. In the present embodiment, control unit 197 also serves as the image processing unit.

Paper feed unit 190 includes a recording paper feeding unit 194 for feeding a sheet of recording paper to image forming device 193, and an LCC (Large Capacity Cabinet) 204 for containing and feeding a large amount of recording paper.

Figure 11:
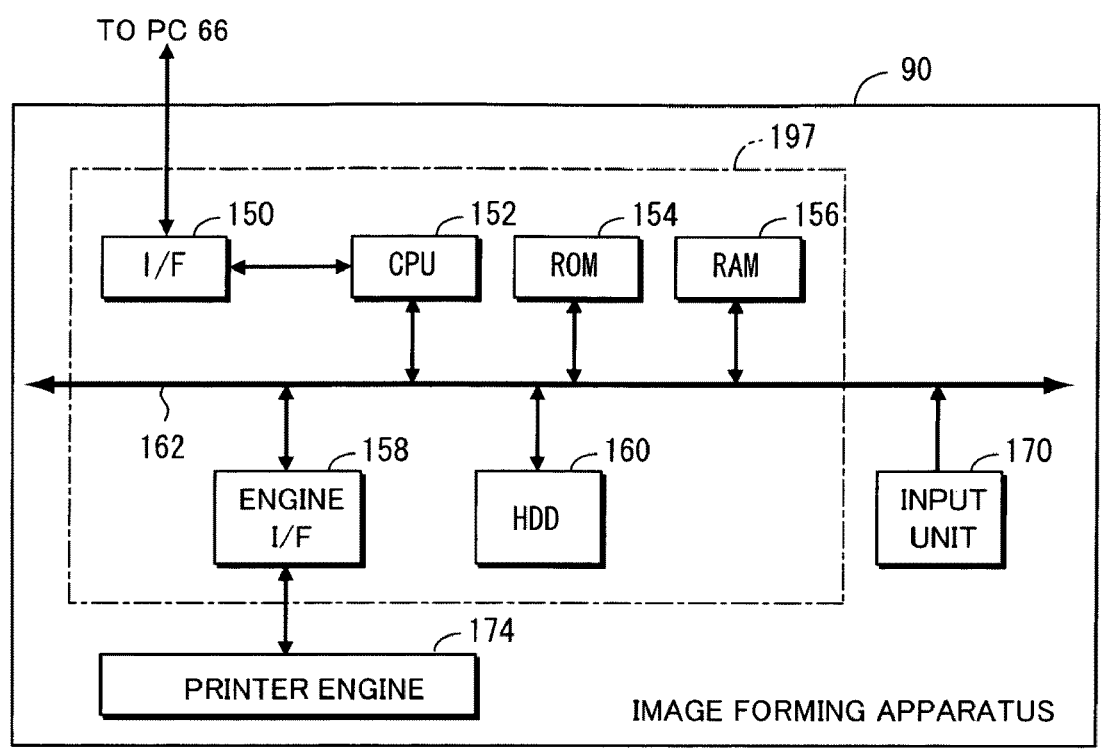
FIG. 11 shows, in a schematic block diagram, hardware configuration of image forming apparatus 90.

Referring to FIG. 11, image forming apparatus 90 includes a bi-directional bus 162, an input unit 170 connected to bus 162, converting a user instruction to a signal and outputting it to bus 162, a control unit 197 connected to bus 162, and a printer engine 174 connected to control unit 197 and carrying out printing in accordance with an instruction from control unit 197.

Control unit 197 includes; an I/F 150 connected to I/F 128 of PC 66 for mediating communication with PC 66, a CPU 152 connected to I/F 150 and bus 162 for executing a prescribed image processing program for processing and printing the read data and written data received from PC 66 in accordance with color conversion profiles attached respectively, and for executing a program for realizing general functions of image forming apparatus 90, an engine I/F 158 connected to bus 162 and printer engine 174 for mediating communication between CPU 152 and printer engine 174, and an ROM 154, an RAM 156 and an HDD 160, all connected to bus 162.

<Program Configuration>

In the following, the program for executing different processes on the read data and the written data, respectively, and for outputting the results with separate color conversion profiles to image forming apparatus 90 will be described. The program is activated in response to a print instruction through input unit 120 of PC 66 shown in FIG. 7, and executed by CPU 122. In HDD 130 shown in FIG. 7, the color conversion profile for the read data and the color conversion profile and the thickness conversion table for the written data are stored in advance.

Figure 12:
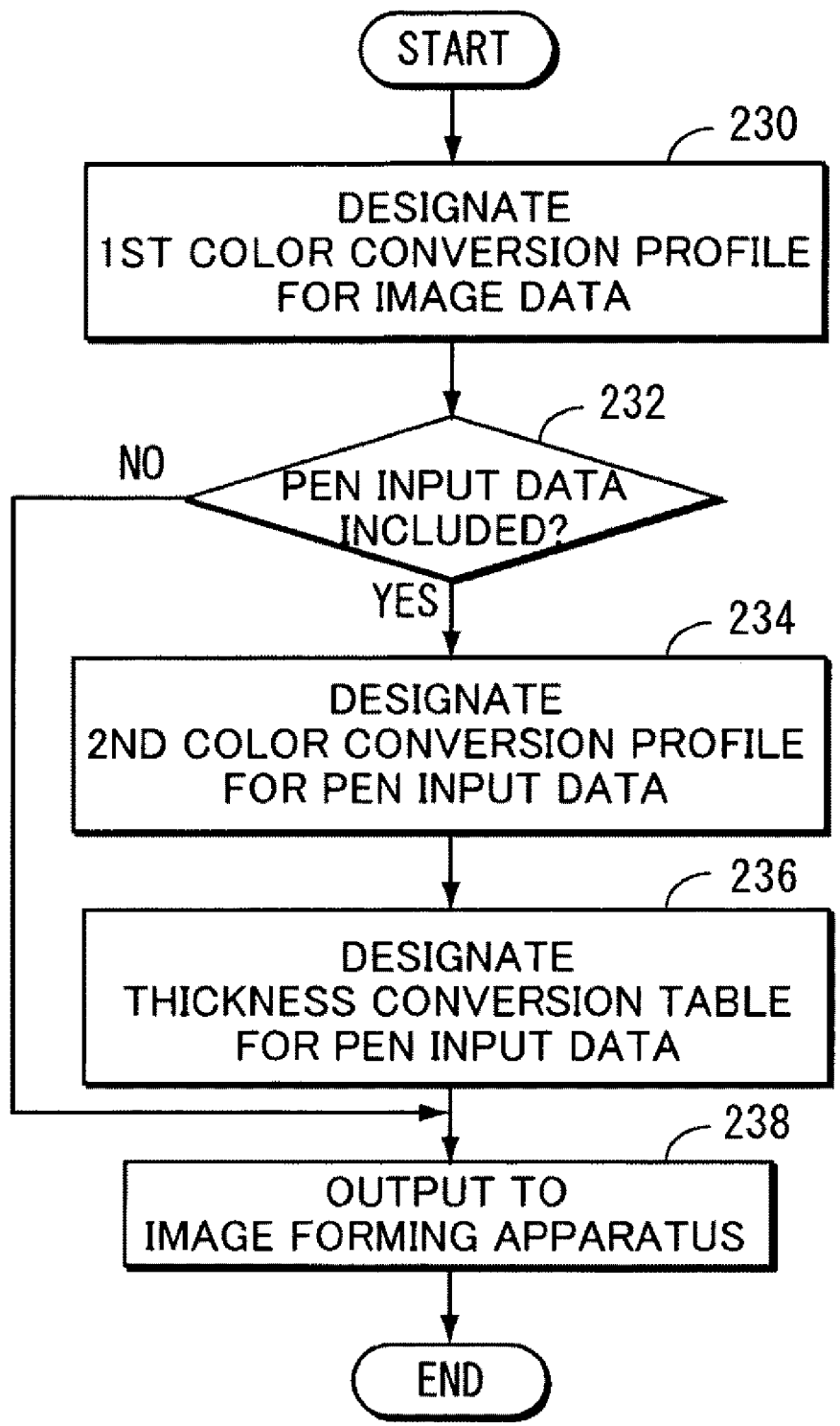
FIG. 12 is a flowchart representing a control structure of a program executed by a CPU 122 shown in FIG. 7, for executing different processes on the read data and the written data, respectively, and for outputting the results with separate color conversion profiles, to image forming apparatus 90.

Referring to FIG. 12, the program includes: a step 230 of converting, of the print object data, the read data to a data format for printing, and designating and attaching to the read data the first color conversion profile; a step 232 of determining whether or not the print object data includes written data, and branching control flow depending on the result of determination; a step 234 executed in response to a determination at step 232 that written data is included, of converting the written data to a data format for printing, designating the second color conversion profile such as the color conversion table 180 shown in FIG. 8 and attaching the same to the written data; a step 236 executed following step 234, of designating and attaching to the written data the thickness conversion table such as the thickness conversion table 182 shown in FIG. 9; and a step 238 executed following step 236, or in response to a determination of NO at step 232, of outputting the print object data and attached profile or profiles to image forming apparatus 90. After step 238, the process ends.

At step 238, if the print object data includes read data only, the read data and the first color conversion profile are output to image forming apparatus 90. If the print object data is the combined data including the read data and the written data, the read data, the first color conversion profile, the written data, the second color conversion profile, and the thickness conversion table are output to image forming apparatus 90.

In the following, a program for performing different image processing on each of the read data and the written data and printing the result, will be described. The program is activated, in image forming apparatus 90, when CPU 152 shown in FIG. 11 receives a signal indicating a print instruction, the print object data and the attached profile or profiles from PC 66, and is executed by CPU 152.

Figure 13:
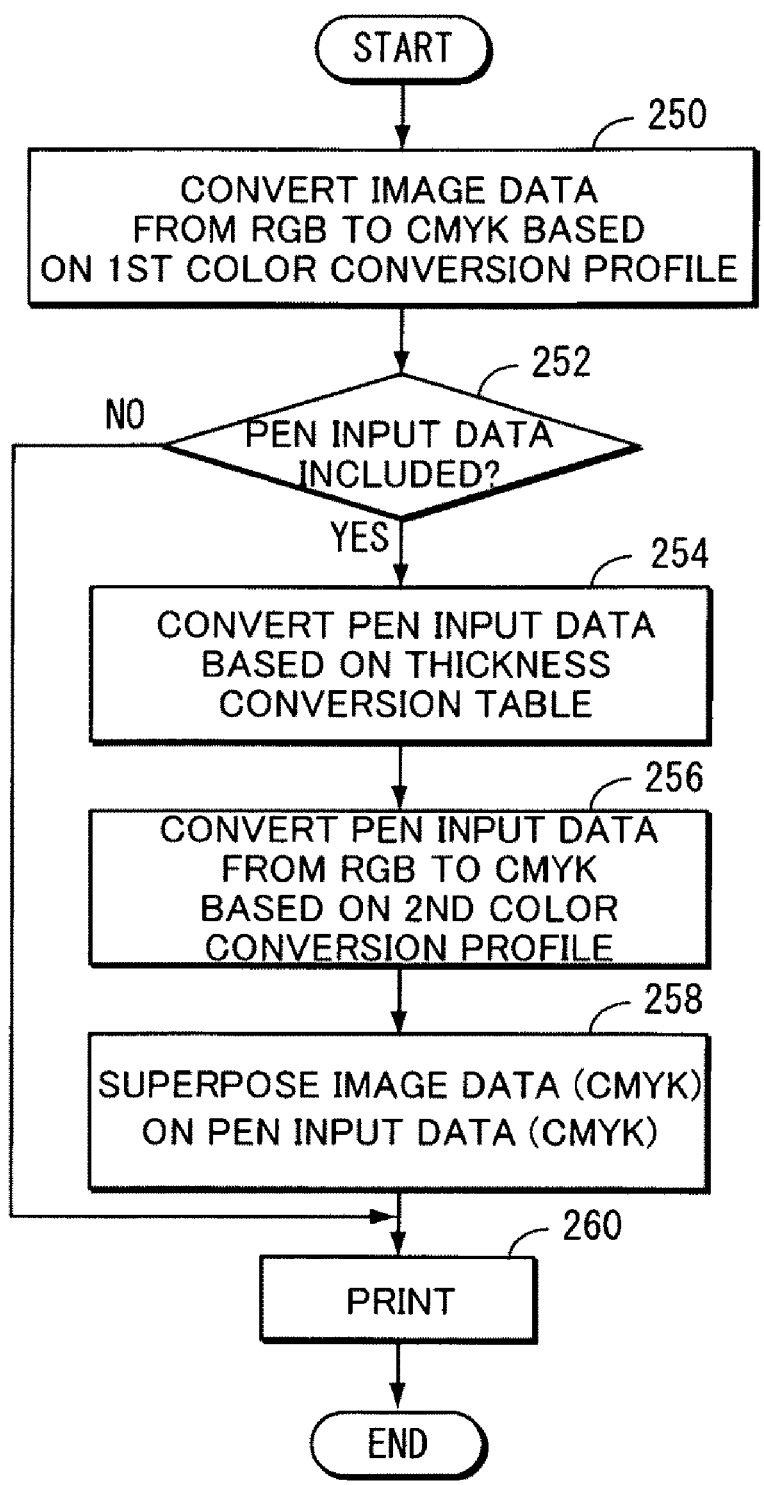
FIG. 13 is a flowchart representing a control structure of a program executed by a CPU 152 shown in FIG. 11, for performing different image processing on the read data and the written data, respectively, and printing the results.

Referring to FIG. 13, the program includes: a step 250 of converting, among the print object data, the read data based on the first color conversion profile from RGB representation to CMYK representation; a step 252 executed following step 250, of determining whether the print object data includes written data, and branching control flow depending on the result of determination; a step 254 executed in response to a determination at step 252 that written data is included, of converting thickness of the written data based on the thickness conversion table attached to the written data; a step 256 executed following step 254, of converting the written data from RGB representation to CMYK representation based on the second color conversion profile attached to the written data; a step 258 executed following step 256, of combining the read data and the written data in CMYK representation; and step 260 executed after step 258 or in response to a determination at step 252 that written data is not included, of executing printing. After step 260, the process ends.

—Operation—

Image processing system 50 having the above-described configuration operates in the following manner. In the following description, for convenience, it is assumed that main powers of all components related to image processing system 50 are all always kept on.

Figure 14:
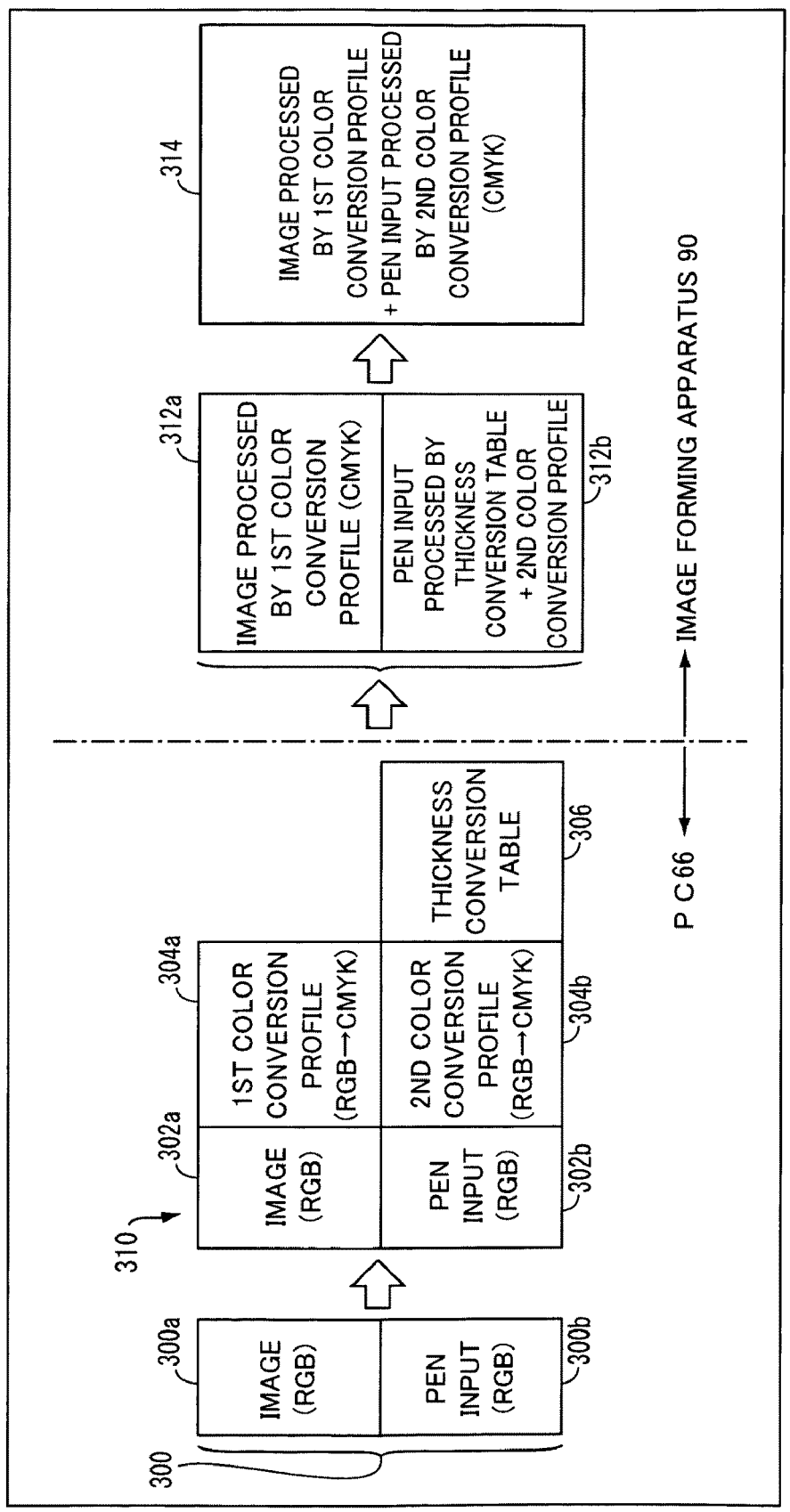
FIG. 14 schematically shows transition of pieces of information stored in storage areas in PC 66 and image forming apparatus 90, at the time of display and at the time of printing.

Referring to FIG. 14, in image processing system 50, read data 300a read by scanner 64, document image reader 186 or the like is displayed on LCD 60. A user inputs written data 300b on touch panel 62, using touch pen 54. Read data 300a and written data 300b are stored as data of separate layers, in RAM 126. CPU 122 combines read data 300a and written data 300b and displays the result as combined data 300 on LCD 60. Read data 300a and written data 300b are both represented in RGB color system. The manner of storage is the same when combined data 300 is stored in HDD 130 in accordance with a user instruction.

In response to the print instruction mentioned above, the program, of which control structure is shown in FIG. 12, is activated. At step 230 shown in FIG. 12, CPU 122 converts read data 300a to read data 302a of a data format for printing. Further, CPU 122 designates a first color conversion profile 304a for the read data 302a, for converting RGB representation to CMYK representation, from among the pieces of image processing information stored in HDD 130.

At steps 232 to 236 shown in FIG. 12, CPU 122 converts written data 300b to written data 302b of a data format for printing. CPU 122 further designates a second color conversion profile 304b and a thickness conversion table 306 for the written data 302b, for converting RGB representation to CMYK representation, from among the pieces of image processing information stored in HDD 130.

At step 238 shown in FIG. 12, CPU 122 outputs, through I/F 128, data 310 including the above-described read data 302a, the first color conversion profile 304a, written data 302b, the second color conversion profile 304b, and thickness conversion table 306, to image forming apparatus 90.

If the print object data does not include written data, only the read data 302a and the first color conversion profile 304a are output.

In response, image forming apparatus 90 operates in the following manner. Referring to FIGS. 11 and 14, when I/F 150 receives the print instruction signal and data 310 from PC 66, the program having the control structure shown in FIG. 13 is activated in response. CPU 152 performs image processing as will be described in the following, on data 310, and stores the processed data in RAM 156. Specifically, at step 250 shown in FIG. 13, CPU 152 converts read data 302a to CMYK representation using the first color conversion profile 304a, whereby read data 312a is formed and stored. At steps 252 to 256 shown in FIG. 13, written data 302b is subjected to thickness conversion using thickness conversion table 306, and further subjected to CMYK conversion using the second color conversion profile 304b, whereby written data 312b is formed and stored.

At step 258, CPU 152 combines read data 312a and written data 312b to form data 314, and prints the same.

If the input print object data includes read data only, only the read data 312a is printed.

In the following, as a more specific example, an exemplary conversion of color values when the read data and written data are converted from RGB representation to CMYK representation using the first and second color conversion profiles 304a and 304b will be described.

Figure 15A:
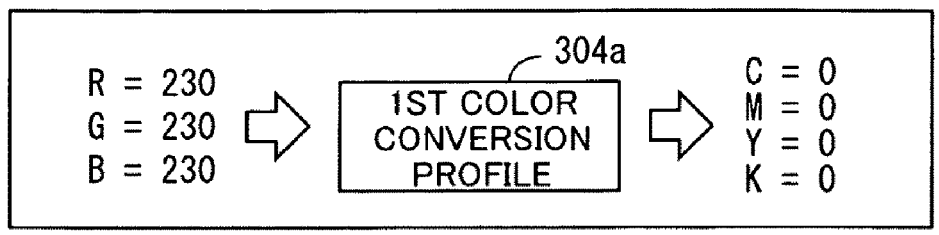
FIGS. 15A to 15D show manner of change of numerical values representing colors when the read data and the written data, displayed on image processing system 50, are printed.
Figure 15B:
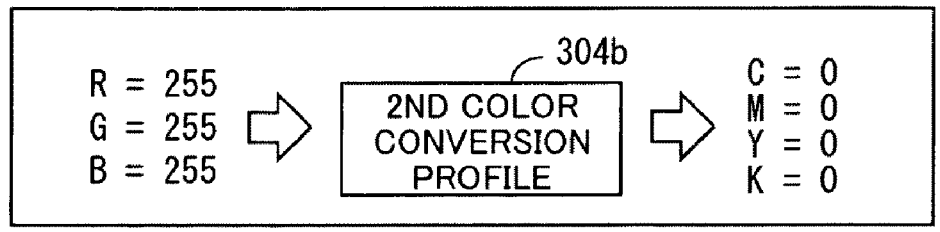
Figure 15C:
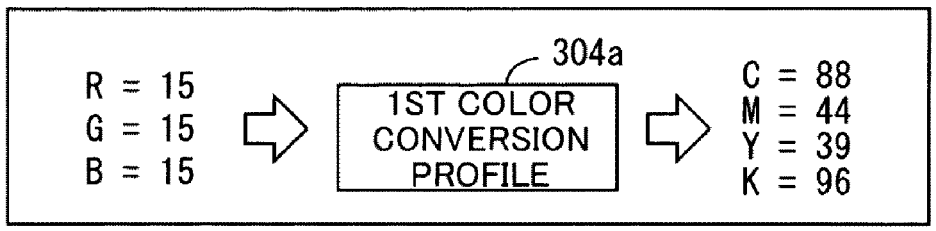
Figure 15D:
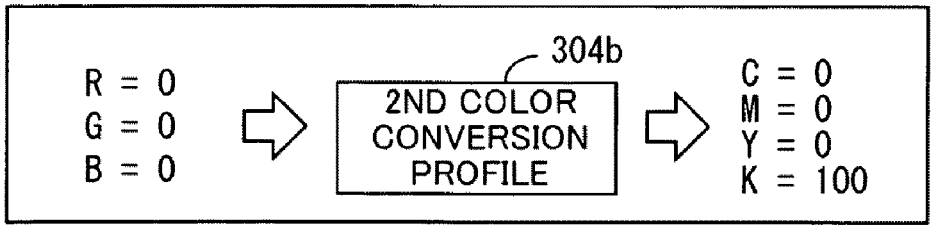

FIGS. 15A and 15C show typical examples of conversion of the read data, and FIGS. 15B and 15D show typical examples of conversion of the written data. In these figures, the values of R, G and B on the left side represent values of RGB representation of a pixel on LCD 60 of information display apparatus 52. The values of C, M, Y and K on the right side represent values of CMYK representation when the color represented by R, G and B on the left side is converted by using a color conversion profile to be printed by image forming apparatus 90. FIGS. 15A and 15B represent examples of white, and FIGS. 15C and 15D represent examples of black.

Referring to FIGS. 15A and 15B, let us compare color conversions of read data and written data of white. In FIG. 15A the values R, G and B in RGB representation are all 230, and in FIG. 15B, the values R, G and B in RGB representation are all 255. At the time of printing, both in FIGS. 15A and 15B, the values are C=M=Y=K=0.

Referring to FIGS. 15C and 15D, let us compare color conversions of read data and written data of black. The values in RGB representation are different, that is, in FIG. 15C the values R, G and B are all 15, and in FIG. 15D, the values R, G and B are all 0. At the time of printing, the values C, M, Y and K are all different.

The difference in conversion results from use of color conversion profiles that are optimal for the read data and the written data, respectively.

From the foregoing, it can be understood that by performing different color conversions on the read data and the written data and printing the result, difference in color tone in each of the read data and written data before and after processing is avoided as much as possible. Therefore, in the present embodiment, change in color tone at the time of printing can be reduced both in the read data and the written data.

As described above, by the image processing system 50 in accordance with the present embodiment, when combined data including read data and written data is to be printed, both the read data and the written data can be subjected to optimal image processing, respectively, before printing. Further, it is possible to reproduce both the read data and the written data in the color and manner of printing similar to those at the time of display. By the image processing system 50, it is possible, when printing the combined data, to reflect the brilliant display color of the written data on the printed image.

Modifications

In the first embodiment, image processing of raw data is performed in the image forming apparatus. The present invention, however, is not limited to such an embodiment. Any manner of processing may be adopted, provided that optimal image processing is done on the read data and written data, respectively, and the displayed color can be reflected on printing. For instance, the information display apparatus may perform image processing based on optimal color conversion profiles on the raw read data and raw written data, and may output combined data including the read data and written data as a result of image processing, to the image forming apparatus. In that case, if the print object data includes read data only, only the read data after image processing is output to the image forming apparatus.

In the embodiment described above, when written data is included, the second image processing 40 is always enabled, and printing is done by applying separate color conversion profiles to the read data and the written data. The present invention, however, is not limited to such an embodiment. For instance, the second image processing 40 may be disabled by a certain set value, so that the operation can be switched to a mode in which, as in the prior art, a single, first color conversion profile is equally applied both to the read data and the written data.

The embodiment described above solves the problem encountered at the time of printing, which problem comes from the difference in RGB value ranges of the image read by a color scanner and the written data. The data handled by the present system, however, is not limited to the image read by a color scanner. By way of example, if a device such as a camera that forms an image with RGB range specific to the device is used, a special color conversion profile may be prepared as in the case of a color scanner, and the data obtained by the device may be subjected to image processing separate from the written data.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus for performing an image processing of converting a value of an RGB color system used for display to a value of a CMYK color system used for printing, comprising:
    a storage unit storing color image data including color image data of a first type and color image data of a second type as written data;
    a first image processing circuit executing a first color conversion process on said color image data of the first type, using a first color conversion profile optimized for the color image data of the first type, in response to a predetermined instruction of image processing; and
    a second image processing circuit executing, in response to said instruction, a second color conversion process different from said first color conversion process, using a second color conversion profile optimized for said written data, and executing a process for converting a thickness of each said written data, using a thickness conversion table prepared in advance in accord with a user's request, on said color image data of the second type; wherein,
    said second color conversion profile is a prescribed color conversion table including a column indicating a color number for identifying a color, a column indicating an RGB value of each color when displayed, and a column indicating a CMYK value of each color when printed; and
    said thickness conversion table includes a column indicating a thickness of each written data when displayed, and a column indicating a print dot number corresponding to the thickness of each written data when printed.

2. The image processing apparatus according to claim 1, further comprising
    an output device superposing, on said color image data of the first type color-converted by said first image processing circuit, said color image data of said second type color-converted by said second image processing circuit, and outputting the superposed data.

3. The image processing apparatus according to claim 2, wherein
    said first image processing circuit includes
        a first profile designating unit designating, in response to said instruction, a first color conversion profile prepared in advance for said color image data of the first type, and
        a first color-conversion circuit executing, in response to said instruction, said first color conversion process on said color image data of the first type based on said first color conversion profile designated by said first profile designating unit.

4. The image processing apparatus according to claim 3, wherein
    said second image processing circuit includes
        a second profile designating unit designating, in response to said instruction, a second color conversion profile, different from said first color conversion profile, prepared in advance for said color image data of the second type, and
        a second color-conversion circuit executing, in response to said instruction, said second color conversion process on said color image data of the second type based on said second color conversion profile designated by said second profile designating unit.

5. The image processing apparatus according to claim 4, further comprising
    a controller enabling or disabling said second image processing circuit; wherein
    said first image processing circuit includes an image processing executing unit executing, when said second image processing circuit is disabled by said controller, said first color conversion process both on said color image data of the first type and the second type, and executing, when said second image processing circuit is enabled, said first color conversion process on said color image data of the first type.

6. The image processing apparatus according to claim 5, wherein
    said first and second color conversion profiles include first and second conversion tables for converting values of RGB color system of said color image data of the first and second types to values of CMYK color system, respectively.

7. The image processing apparatus according to claim 6, wherein in said first color conversion table, a range of RGB values that can be converted to the CMYK values is selected to be narrower than a range of RGB values that can be converted to the CMYK values in said second color conversion table.

8. The image processing apparatus according to claim 7 further comprising
    a reading device reading image information of a document and outputting the read image information as color image data of the first type;
    a display device displaying an image based on said read data; and
    a receiving unit receiving image information written to said image displayed on said display device, and outputting said image information as said color image data of said second type.

9. The image processing apparatus according to claim 2, wherein
    said first image processing circuit includes a first profile designating unit designating, in response to said instruction, a first color conversion profile prepared in advance for said color image data of the first type, and
    said second image processing circuit includes
        a second profile designating unit designating in response to said instruction, a second color conversion profile, different from said first color conversion profile, prepared in advance for said color image data of the second type;
    said image processing apparatus further comprising
        a transmitting unit transmitting to the outside, a combination of said color image data of the first type and said first color conversion profile, and a combination of said color image data of the second type and said second color conversion profile.

10. The image processing apparatus according to claim 9, wherein said first and second color conversion profiles include first and second color conversion tables for converting values of RGB color system of said color image data of the first and second types to values of CMYK color system, respectively.

11. The image processing apparatus according to claim 10, wherein in said first color conversion table, a range of RGB values that can be converted to the CMYK values is selected to be narrower than a range of RGB values that can be converted to the CMYK values in said second conversion table.

12. The image processing apparatus according to claim 11, further comprising
a reading device reading image information of a document and outputting the read image information as color image data of the first type;
a display device displaying an image based on said read data; and
a receiving unit receiving image information written to said image displayed on said display device, and outputting said image information as said color image data of said second type.

13. The image processing apparatus according to claim 1, further comprising
a determination circuit determining, in response to said instruction, whether or not color image data as an object of processing includes said color image data of the second type, and outputting a determination signal; and
a suspending circuit suspending, when it is indicated by said determination signal that said color image data as the object of processing does not include said color image data of said second type, operation of said second image processing circuit.

14. The image processing apparatus according to claim 13, wherein said first and second color conversion profiles include first and second color conversion tables for converting values of RGB color system of said color image data of the first and second types to values of CMYK color system, respectively.

15. The image processing apparatus according to claim 14, wherein in said first color conversion table, a range of RGB values that can be converted to the CMYK values is selected to be narrower than a range of RGB values that can be converted to the CMYK values in said second conversion table.

16. The image processing apparatus according to claim 15, further comprising
a reading device reading image information of a document and outputting the read image information as color image data of the first type;
a display device displaying an image based on said read data; and
a receiving unit receiving image information written to said image displayed on said display device, and outputting said image information as said color image data of said second type.

17. The image processing apparatus according to claim 1, further comprising
a reading device reading image information of a document and outputting the read image information as color image data of the first type;
a display device displaying an image based on said read data; and
a receiving unit receiving image information written to said image displayed on said display device, and outputting said image information as said color image data of said second type.

18. An image processing method for performing an image processing of converting a value of an RGB color system used for display to a value of a CMYK color system used for printing, comprising the steps of:
storing in a storage device color image data including color image data of a first type and color image data of a second type as written data;
executing, in response to a predetermined instruction of image processing, a first color conversion process on said color image data of the first type, using a first color conversion profile optimized for the color data of said first type, by a first image processing circuit; and
executing, in response to said instruction, a second color conversion process, different from said first color conversion process, using a second color conversion profile optimized for said written data, and executing a process for converting a thickness of each said written data, using a thickness conversion table prepared in advance in accordance with a user's request, on said color image data of the second type by a second image processing circuit; wherein
said second color conversion profile is a prescribed color conversion table including a column indicating a color number for identifying a color, a column indicating an RGB value of each color when displayed, and a column indicating a CMYK value of each color when printed; and
said thickness conversion table includes a column indicating a thickness of each written data when displayed, and a column indicating a print dot number corresponding to the thickness of each written data when printed.

19. The image processing method according to claim 18, further comprising the step of
superposing, on said color image data of the first type color-converted at said step of executing the first color conversion process, said color image data of the second type color-converted at said step of executing the second color conversion process, and outputting the superposed data.

20. A nontransistory computer-readable medium storing a program that when executed by a computer causes said computer to operate as an image processing apparatus for performing an image processing of converting a value of an RGB color system used for display to a value of a CMYK color system used for printing, including:
a storage unit storing color image data including color image data of a first type and color image data of a second type as written data;
a first image processing circuit executing a first color conversion process on said color image data of the first type, using a first color conversion profile optimized for the color data of the first type, in response to a predetermined instruction of image processing; and
a second image processing circuit executing, in response to said instruction, a second color conversion process different from said first color conversion process, using a second color conversion profile optimized for written data, and executing a process for converting a thickness of each said written data, using a thickness conversion table prepared in advance in accordance with a user's request, on said color image data of the second type; wherein
said second color conversion profile is a prescribed color conversion table including a column indicating a color number for identifying each color, a column indicating an RGB value of each color when displayed, and a column indicating a CMYK value of each color when printed; and said thickness conversion table includes a column indicating a thickness of each written data when displayed, and a column indicating a print dot number corresponding to the thickness of each written data when printed.

* * * * *